US008817018B1

(12) United States Patent
Fan et al.

(10) Patent No.: US 8,817,018 B1
(45) Date of Patent: Aug. 26, 2014

(54) USING PHOTOGRAPHIC IMAGES TO CONSTRUCT A THREE-DIMENSIONAL MODEL WITH A CURVED SURFACE

(75) Inventors: Zhe Fan, Boulder, CO (US); Brian Gammon Brown, Boulder, CO (US); Tilman Reinhardt, Woodside, CA (US); Matthew Robert Simpson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/159,219

(22) Filed: Jun. 13, 2011

(51) Int. Cl.
*G06T 15/00* (2011.01)

(52) U.S. Cl.
USPC .......................................... 345/419

(58) Field of Classification Search
CPC ...... G01B 15/04; G01C 11/00; G01V 5/0025; G06T 17/00; G06T 2200/08; G06T 7/0028; G06T 7/0051
See application file for complete search history.

(56) References Cited

U.S. PATENT DOCUMENTS

| 6,912,293 | B1 | 6/2005 | Korobkin | |
|---|---|---|---|---|
| 2008/0211809 | A1* | 9/2008 | Kim et al. | 345/420 |
| 2010/0008565 | A1* | 1/2010 | Chien | 382/154 |
| 2010/0271369 | A1* | 10/2010 | Chang et al. | 345/423 |
| 2010/0284607 | A1* | 11/2010 | Van Den Hengel et al. | 382/154 |
| 2011/0161061 | A1* | 6/2011 | Wu et al. | 703/2 |

OTHER PUBLICATIONS

Desbrun et al., "Interactive animation of structured deformable objects," Proceedings of the 1999 Conference on Graphics Interface, 1999, 8 pages.
Nealen et al., "Physically Based Deformable Models in Computer Graphics," STAR—State of the Art Report, The Eurographics Association 2005, 24 pages.
"Soft body dynamics," Wikipedia, the free encyclopedia, http://en.wikipedia.org/wiki/Soft_body_dynamics, accessed May 9, 2011, 7 pages.

\* cited by examiner

*Primary Examiner* — Kee M Tung
*Assistant Examiner* — Frank Chen
(74) *Attorney, Agent, or Firm* — Dority & Manning, P.A.

(57) ABSTRACT

Embodiments relate to constructing a three-dimensional model using a plurality of two-dimensional photographic images. In a first embodiment, a first user input specifying a first position on a first photographic image may be received. A second user input specifying a second position on a second photographic image may be received, the second photographic image having a second perspective, specified by a second set of camera parameters, being different from a first perspective of the first image specified by a first set of camera parameters. The user inputs may indicate corresponding features in the images. Using photogrammetry, a point in a three-dimensional space may be determined according to the first position, the second position, the first set of camera parameters, and the second set of camera parameters. A surface of the three-dimensional model may be determined, whereby the surface may be curved to the point in three-dimensional space determined earlier.

21 Claims, 4 Drawing Sheets

USING PHOTOGRAPHIC IMAGES TO CONSTRUCT A THREE-DIMENSIONAL MODEL WITH A CURVED SURFACE

BACKGROUND

1. Field of the Invention

This field is generally related to photogrammetry.

2. Related Art

Three-dimensional modeling tools and other computer-aided design (CAD) tools enable users to define three-dimensional models, such as a three-dimensional model of a building. Photographic images of the building may be available from, for example, satellite, aerial, vehicle-mounted street-view and user cameras. The photographic images of the building may be texture mapped to the three-dimensional model to create a more realistic rendering of the building.

BRIEF SUMMARY

Embodiments relate to using photographic images to construct a three-dimensional model with a curved surface. In an embodiment, a computer-implemented method constructs a three-dimensional model using a set of two-dimensional photographic images. In the method, a first user input specifying a first position is received on a first photographic image in the plurality of two-dimensional photographic images. The first photographic image has a first perspective specified by a first set of camera parameters. A second user input specifying a second position on a second photographic image in the plurality of two-dimensional photographic images is also received. The second photographic image has a second perspective different from the first perspective and specified by a second set of camera parameters. The second user input also indicates that a feature located at the second position on the second photographic image corresponds to a feature located at the first position on the first photographic image. Using photogrammetry, a point in three-dimensional space is determined according to the first position, the second position, the first set of camera parameters, and the second set of camera parameters. A surface of the three-dimensional model is determined, the surface curved to the point in three-dimensional space earlier determined.

Systems and computer program products for construction a three-dimensional model with a curved surface are also described.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to creating three-dimensional models from two-dimensional images. A user may specify a first point on a first two-dimensional image and a second point on a second two-dimensional image. A user may further indicate that the two points correspond to each other. Using photogrammetry, a point in three-dimensional space may be determined based on the two user specified points. Then, a surface of the three-dimensional model may be determined. The surface is curved towards the point in the three-dimensional space. This and other embodiments are described below with reference to the accompanying drawings.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some modeling tools enable users to use two-dimensional images to specify the geometry of rigid primitive shapes in three-dimensional space. In examples, rigid primitive shapes may include, but are not limited to, boxes, gables, hips, pyramids, top-flat pyramids, or ramps. By defining positions of fixed points on a shape, such as vertices of the shape, in two-dimensional images, photogrammetry may be used to deduce the geometry of those shapes in a three-dimensional environment.

Figure 1:
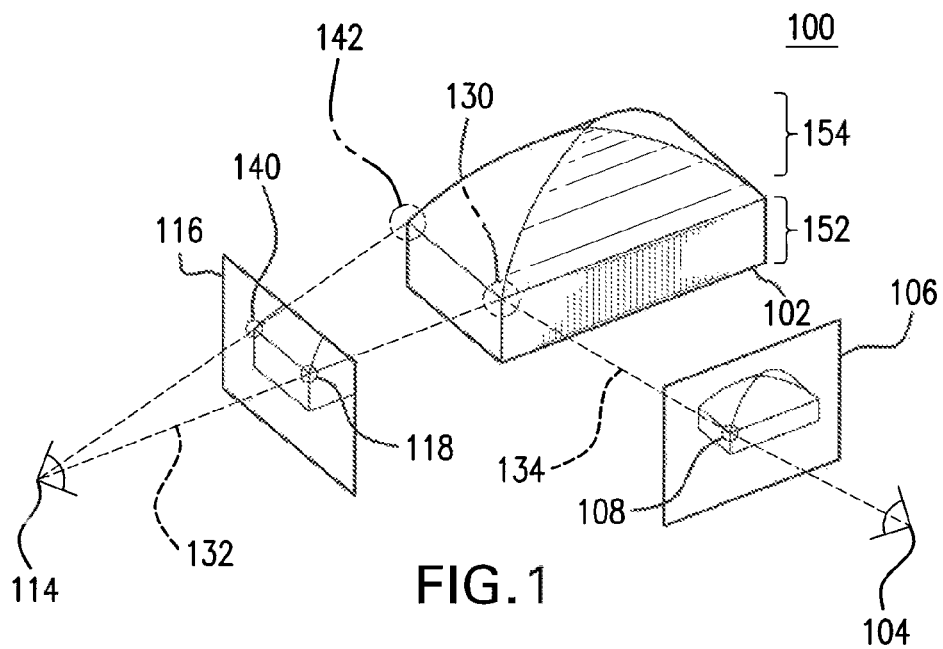
FIG. 1 is a diagram illustrating construction of a three-dimensional model using a plurality of two-dimensional images.

FIG. 1 shows a diagram 100 illustrating construction of a three-dimensional building 102 using a plurality of two-dimensional images. Building 102 has portions 152 and 154. Portion 152 may be modeled by a rigid primitive shape, e.g., a rectangular prism. Portion 154 includes a curved surface, which may be difficult to model using solely rigid, primitive shapes. Embodiments enable modeling of portion 154, including its curved surface, using photographic images.

Diagram 100 shows a three-dimensional model 102 and multiple photographic images 116 and 106 of a building. Images 116 and 106 may have been captured from cameras having different perspectives, as illustrated by camera 114 and 104. A user may input constraints 118 and 108 on images 116 and 106, respectively, and those constraints may be used to determine the geometry of a shape to model portion 152. For example, constraints 118 and 108 may map a position on two dimensional images 116 and 106 to respective features of a three-dimensional model. The geometry of the shape may be specified by a set of geometric parameters, representing, for example, a position of an origin point (e.g., x, y, and z coordinates), a scale (e.g., height and width), and an orientation (e.g., pan, tilt, and roll). Depending on the type of shape (e.g., box, gable, hip, pyramid, top-flat pyramid, or ramp) additional geometric parameters may be needed. For example, to specify the geometry of a gable, the angle of the gable's slopes or a position of the gable's tip may be included in the geometric parameters.

To determine the shape's geometry, the user constraints from the images may be used to determine rays in three-dimensional space, and the rays are used to determine the geometry. In diagram 100, a ray 132 may be determined based on user constraint 118, and a ray 134 may be determined based on a user constraint 108. Rays 132 and 134 may be constructed based on parameters associated with cameras 114 and 104 respectively. For example, ray 132 may be extended from a focal point or entrance pupil of camera 114 through a point corresponding to user constraint 118 at a focal length distance from the focal point of camera 114. Similarly, ray 134 may be extended from a focal point or entrance pupil of camera 104 through a point corresponding to user constraint 108 at a focal length distance from the focal point of camera 104. Using rays 132 and 134, a position 130 on the shape may be determined. This process is known as photogrammetry. In this way, a geometry of a shape representing portion 152 may be determined based on user constraints 118 and 108, and parameters representing cameras 114 and 104.

However, the parameters representing cameras 114 and 104 may not be accurate. In an embodiment, the camera parameters may include a position, orientation (e.g., pan, tilt, and roll), angle, focal length, prism point, and a distortion factor of each of cameras 114 and 104. In an example, photographic images 116 and 106 may have been taken from satellites, vehicles, or airplanes, and the camera position and orientation may not be completely accurate. Alternatively, one or both of photographic images 116 and 106 may have been taken by a user with only a general idea of where her camera was positioned when it took the photo. The photogrammetry techniques used to determine the shape's geometry may also be used to increase the accuracy of the camera parameters.

In cases where the camera parameters are inaccurate, a photogrammetry algorithm may need to solve both the camera parameters representing the cameras that took the photographic images and geometric parameters representing the three-dimensional model. This may represent a non-linear optimization problem.

Figure 2:
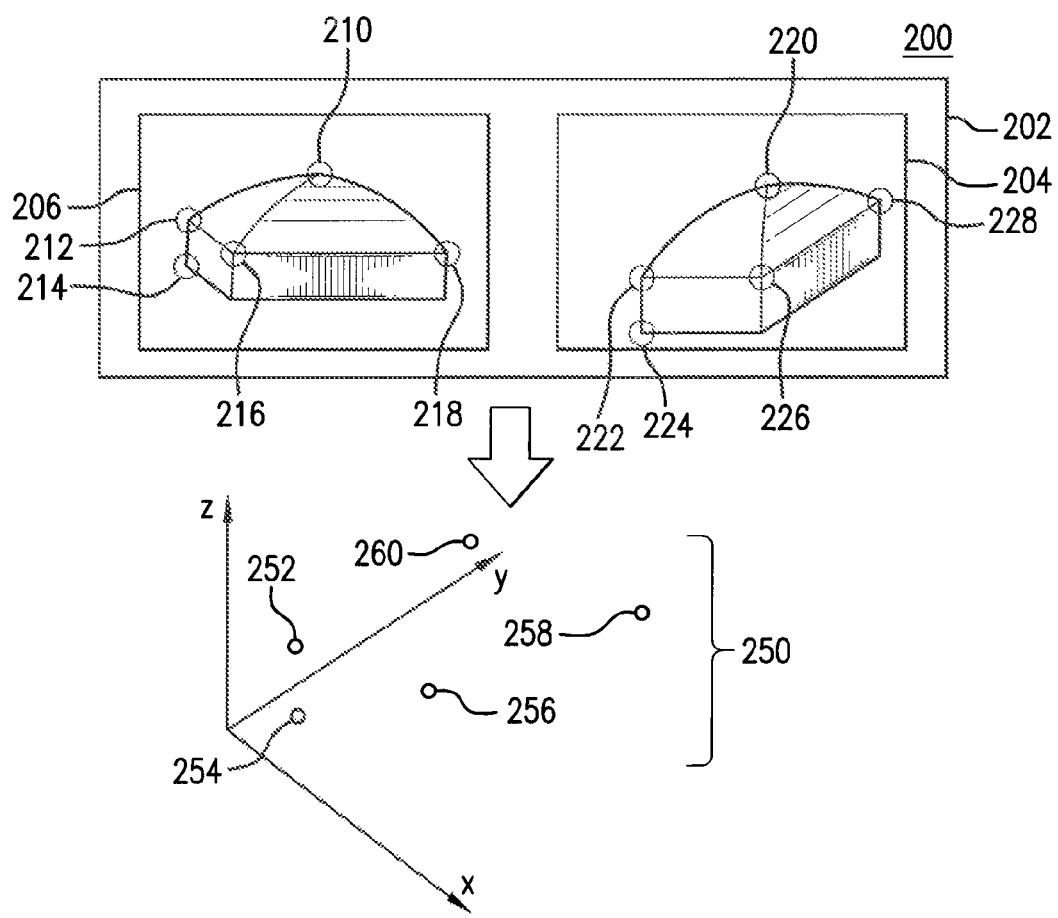
FIG. 2 is a diagram illustrating definition of points in three-dimensional space from constraints on a plurality of two-dimensional images.

FIG. 2 is a diagram 200 illustrating defining points in three-dimensional space from constraints on a plurality of two-dimensional images. Diagram 200 shows a plurality of photographic images 202, which includes images 204 and 206. Both images 204 and 206 have been taken of building 102, but from different perspectives. By specifying points on image 206 and corresponding points on image 204, a user may specify a geometry as described with respect to FIG. 1. Specifically, the user may specify points 250 in three-dimensional space.

To model portion 102 of the building, a user may, for example, identify vertices of portion 102 in both image 206 and image 204. For example, as shown in diagram 200, a user may specify that a point 212 in image 206 corresponds to a point 222 in image 204. The photogrammetry algorithm may triangulate points 212 and 222 with the respective camera parameters for photographic images 206 and 204 to determine point 252 in three-dimensional space. Similarly, the user may specify that a point 214 corresponds to a point 224 to determine a corresponding point 254 in three-dimensional space; the user may specify that a point 216 corresponds to a point 226 to determine a corresponding point 256 in the three-dimensional space; and the user may specify that a point 218 corresponds to a point 228 to determine a corresponding point 258 in the three-dimensional space. Points 252, 254, 256, and 258 may specify the vertices of a rectangular prism that models portion 102.

However, the rectangular prism does not accurately model the curved roof of building 102. To specify the curved surface, a user may need to model yet another point in three dimensional space. The additional point may be used to indicate the direction of curvature and the amount of curvature.

As illustrated in FIG. 2, a user specifies a point 210 on image 212 and that point 210 corresponds to a point 220 on image 204. Points 210 and 214 are used to determine, through photogrammetry, a corresponding point 260 in three-dimensional space. Point 260 may be used to model portion 154 of building 102, including its curved surface.

Together, point 260 specifying the curved surface of portion 154 and points 252, 254, 256, and 258 representing the vertices of portion 102 are used to construct a three-dimensional model representing building 102.

Figure 3:
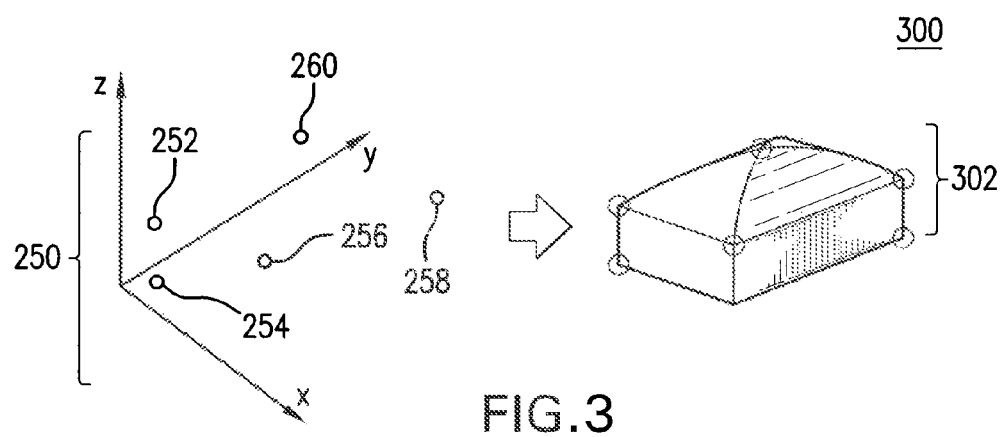
FIG. 3 is a diagram illustrating construction of a three-dimensional model with a curved surface from the points in the three-dimensional space defined in FIG. 2.

FIG. 3 shows a diagram 300 illustrating construction of a three-dimensional model 302 with a curved surface from the points 250 in three-dimensional space. As illustrated in diagram 300, three-dimensional model 302 has vertices at positions specified by points 252, 254, 256, and 258. Further, the three-dimensional model 302 includes a surface curved toward point 260. In an embodiment, the curved surface may be represented by a mesh of polygons as illustrated, for example, in FIG. 4.

Figure 4:
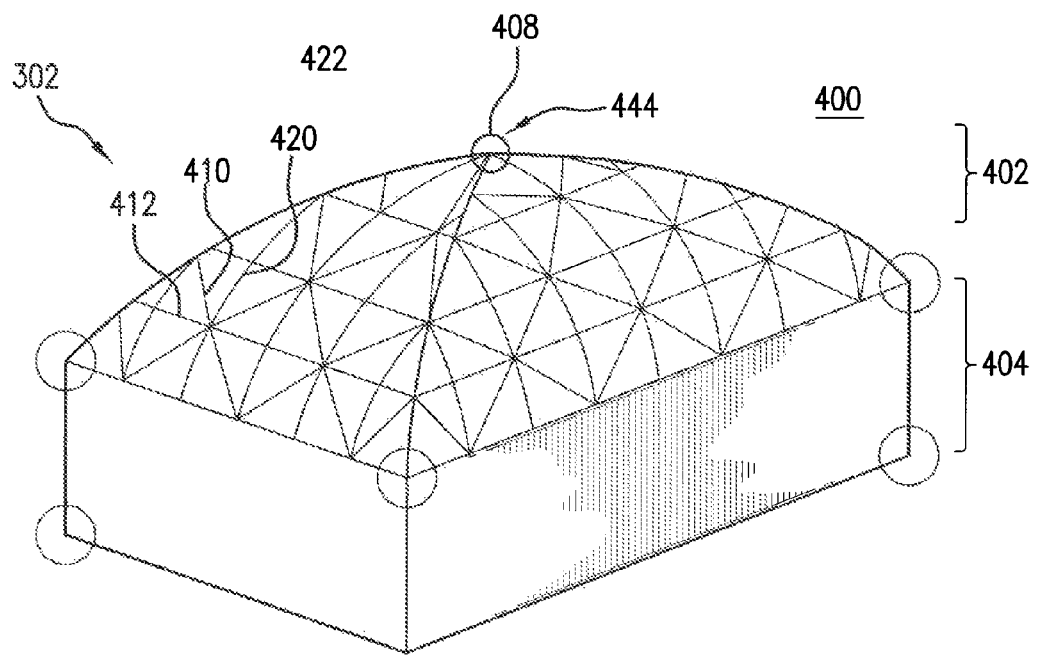
FIG. 4 is a diagram illustrating construction of the three-dimensional model in greater detail.

FIG. 4 is a diagram 400 illustrating construction of the three-dimensional model 302 in greater detail. Diagram 400 shows a point 408 in three-dimensional space. As mentioned above, point 408 may be deduced using photogrammetry based on user-specified points in two-dimensional photographic images. Diagram 400 also shows that three-dimensional model 302 includes a curved surface 402 and a rectangular prism portion 404. Surface 402 is curved toward point 408 in three-dimensional space. In the example in diagram 400, while surface 402 curved to make contact with point 408. In that example, surface 402 may be determined such that, at point 408, surface 402 is most distant from rectangular prism portion 404. However, in other examples not shown, surface 402 may be determined such that it is curved toward point 408, but does not make contact with point 408.

Surface 402 may, for example, be represented as a mesh of polygons, such as triangles. The mesh of polygons may include vertices and edges. In one example, each polygon may be specified by listing the three-dimensional coordinates of its vertices. In another example, polygons may be specified by their edges, and the edges may have associated three-dimensional coordinates. Surface 402, for example, includes edges 412, 410 and 420.

In an embodiment, the curvature of surface 402 may be determined, at least in part using mass-spring modeling. With mass-spring modeling, surface 402 may be modeled as a set of point masses (nodes) connected by ideal weightless elastic springs obeying Hooke's law. Hooke's law states that $F=-kx$, where x is the displacement of the spring's end from its equilibrium position (a distance), F is the restoring force exerted by the spring on that end; and k is a constant, often called the rate or spring constant.

The nodes for the mass-spring modeling may either derive from the edges of a two-dimensional polygonal mesh representation of the surface of the object, or from a three-dimensional network of nodes and edges modeling the internal structure of the object. A person of skill in the art would recognize that additional springs between nodes can be added, or the force law of the springs modified, to achieve desired effects. In an example, rendering of a three-dimensional mass-spring lattice is often done using free form deformation, in which the rendered mesh is embedded in the lattice and distorted to conform to the shape of the lattice as it evolves.

Referring back to FIG. 4, the nodes used for mass-spring modeling may include polygon edges, such as edges 410, 412, and 420. In other examples, the nodes may be vertices of the polygons or regularly spaced points on surface 402. The various nodes may be modeled as if they were connected by springs. For example, edges may be modeled as if they were connected to adjacent edges by springs. In diagram 400, edge 410 may be modeled as if connected to edge 420 by a first spring; and edge 410 may be modeled as if connected to edge 412 by a second spring. In this way, edges in the polygon mesh representing surface 402 may be nodes in a three-dimensional network of nodes for mass-spring modeling.

Moreover, the network of nodes may include fixed positions that are not allowed to change by virtue of mass-spring modeling. For example, in diagram 400 surface 402 is connected to edges of rectangular prism 404. At the points where the surface 402 connects to the edges of rectangular prism 404, nodes may have a fixed position. Similarly, three-dimensional point 408 defined by a user using photogrammetry may also represent a fixed position.

Alternatively, additional springs may be modeled between three-dimensional point 408 and nodes representing surface 402. For example, a spring may be modeled between three-dimensional point 408 and a point of surface 402 closest to point 408, shown in diagram 400 as a point 414. Springs may be modeled between three-dimensional point 408 and other nodes representing surface 402 as well. For example, a spring may be modeled between three-dimensional point 408 and edge 420. In one embodiment, a spring may be modeled between three-dimensional point 408 and each node representing surface 402. In this way, a set of springs may be used to model relationships between different points of surface 402, user-defined point 408, and fixed points, such as the edges of rectangular prism 404.

Using the set of springs, the shape of surface 402 may be determined. The shape of surface 402 by reducing the total energy among the springs in the model. The curvature of surface 402 may be altered by altering the spring constant k. Different springs may be represented by different spring constants. For example, springs among the nodes representing surface 402 may have a different spring constant than springs between the nodes representing surface 402 and user-defined point 408. As springs between the nodes representing surface 402 and the user-defined point 408 are made more rigid relative to the springs among the nodes representing surface 402, surface 402 may curve closer to point 408.

In addition to point 408, a user may define other points in three-dimensional space (not shown) using photogrammetry to specify additional curved surfaces or to further specify surface 408. In that example, the user may specify additional points on photographic images, such as the images illustrated in FIG. 2. The user may further specify that those additional points correspond to each other. Using photogrammetry, a second point in three-dimensional space is derived using the additional points and the camera parameters associated with the photographs. Using the second point, surface 408 may be altered to curve toward both user-defined points. Surface 408 has different portions curved toward the different user-defined points. In embodiments where surface 408 is determined using mass-spring, each point may have associated springs connecting the user-defined point with nodes representing the surface. In this way, by defining multiple points, the user can use two-dimensional images to specify different three-dimensional curvatures.

Figure 5:
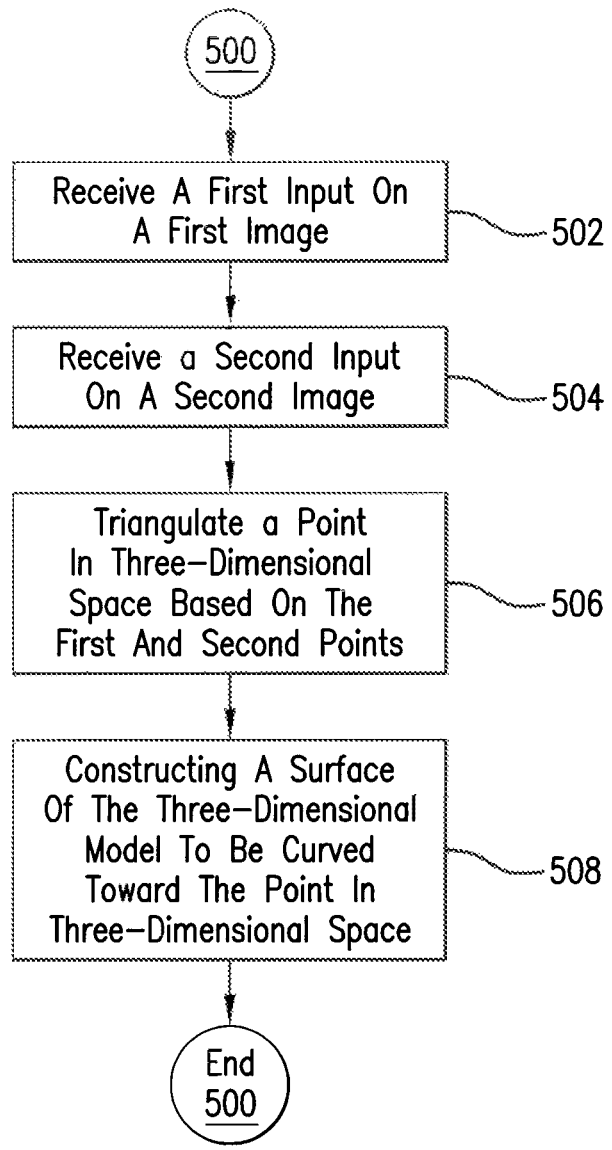
FIG. 5 is a flowchart showing a method for constructing a three-dimensional model using a plurality of two-dimensional photographic images.

FIG. 5 is a flowchart showing a method 500 for constructing a three-dimensional model using a plurality of two-dimensional photographic images.

Method 500 begins at stage 502 by receiving a first input on a first image. In examples, the first input on the first image may by inputted by a user by selecting a point on the first image with a peripheral device (mouse, touch screen, keyboard, etc.). The first user input specifies a first position on a first photographic image in a plurality of two-dimensional photographic images. The plurality of two-dimensional photographic images may include oblique and nadir aerial photographs of the Earth, such as photographs taken from airplanes and satellites. The plurality of two-dimensional photographic images may also include panoramic photographs taken from street level, such as 360 degree panoramas taken from cameras mounted to a vehicle in motion. Finally, the plurality of photographic images may further include photos inputted by the user. For example, the user may take a photo using a digital camera and upload it for use in modeling and perhaps texture mapping. Each image in the plurality of two-dimensional photographic images may have been taken from a different perspective and may have a corresponding set of camera parameters representing aspects of the camera that took the photographic image (e.g., location, orientation, focal length etc.)

At stage 504, a second input on a second image from the plurality of two-dimensional images is received. The second user input specifies a position on the second photographic image. Moreover, the second user input indicates that a feature located at the second position on the second photographic image corresponds to a feature located at the first position on the first photographic image.

At stage 506, a point may be triangulated in a three-dimensional space based on the first and second points. For example, the point may be determined using photogrammetry based on the position received at step 502, the position received at step 504, the camera parameters for the first image, and the camera parameters for the second image. Photogrammetry is described in greater detail above with respect to FIGS. 1 and 2.

At stage 508, a surface of the three-dimensional model may be constructed toward the point in the three-dimensional space determined at stage 506. The surface may be curved outward, and the distance between the surface and the point determined at stage 506 may be determined according to Hooke's law. The surface may be represented by a three-dimensional mesh of two-dimensional polygons. The three-dimensional mesh may be determined such that a distance between respective polygons in the mesh of two-dimensional polygons satisfies Hooke's law.

In this way, method 500 enables a user to construct a curved surface for a three-dimensional model using a plurality of two-dimensional photographic images.

Figure 6:
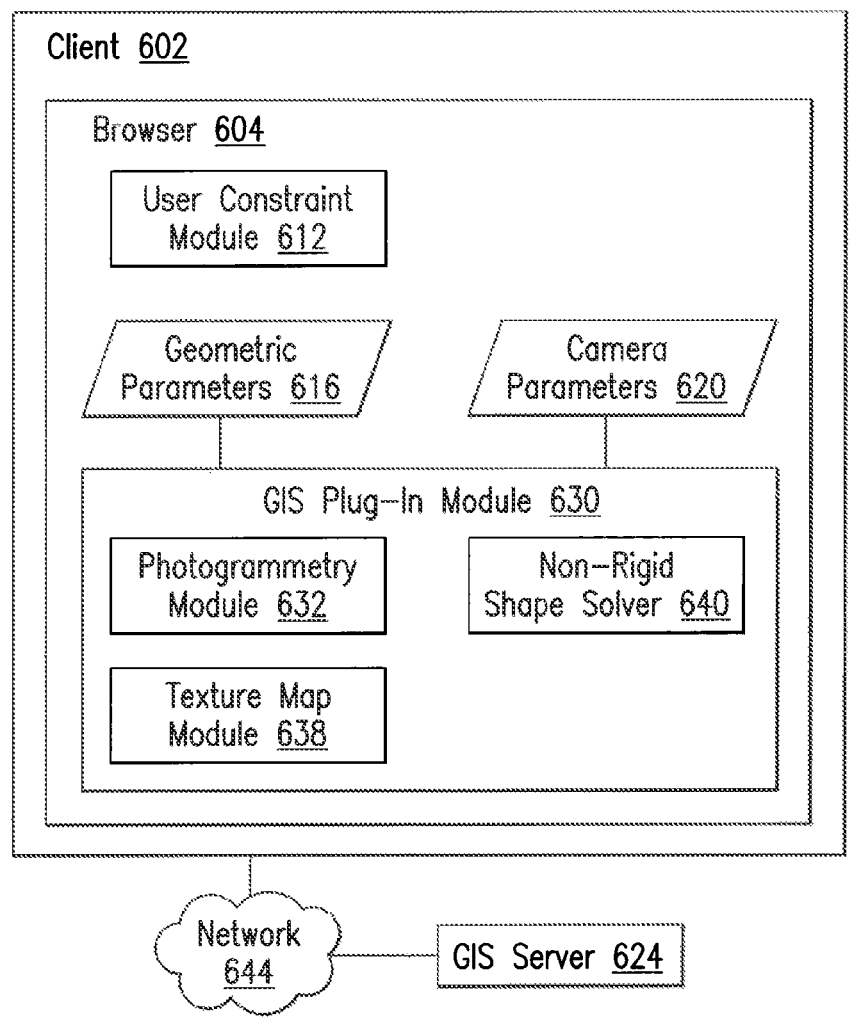
FIG. 6 is a diagram showing a system for creating a three-dimensional model from two-dimensional images.

FIG. 6 is a diagram showing a system 600 for creating a three-dimensional model from two-dimensional images. System 600 may operate as described above with respect to FIGS. 1-5. System 600 may include a client 602 coupled to a GIS server 624 via one or more networks 644, such as the Internet. Client 602 includes a browser 604. Browser 604 includes a user constraint module 612, a GIS plug-in module 630, geometric parameters 616 and camera parameters 620. GIS plug-in module 630 includes a photogrammetry module 632, a texture map module 638, and a non-rigid shape solver 640. Each of these components is described below.

In embodiments, browser 604 may be a CHROME, FIRE-FOX, SAFARI, or INTERNET EXPLORER browser. The components of browser 604 may be downloaded from a server, such as a web server, and run with browser 604. For example, the components of browser 604 may be Hypertext Markup Language (HTML), JavaScript, or a plug-in, perhaps running native code. GIS plug-in module 630 may be a browser plug-in implementing a pre-specified interface and compiled into native code.

Upon receipt of a user selection indicating a particular region at which to create a three-dimensional model, user constraint module 612 may display an interface that may display photographic images of the area. User constraint module 612 may retrieve the images from GIS server 624.

GIS server 624 may include a web server. A web server is a software component that responds to a hypertext transfer protocol (HTTP) request with an HTTP reply. The web server may serve content such as hypertext markup language (HTML), extendable markup language (XML), documents, videos, images, multimedia features, or any combination thereof. This example is strictly illustrative and does not limit the present invention.

User constraint module 612 may receive at least one constraint, input by a user, for a two-dimensional photographic images from the set of two-dimensional photographic images received from GIS server 624. Each constraint indicates that a position on the two-dimensional photographic image corresponds to a position on the three-dimensional model. In an embodiment, a user constraint module may receive a first user input specifying a first position on a first photographic image, and a second user input specifying a second position on a second photographic image. The second user input may further indicate that a feature located at the second position on the second photographic image corresponds to a feature located at the first position on the first photographic image.

Photogrammetry module 632 may modify geometric parameters 616 and camera parameters 620 according to the user constraints received by user constraint module 612. Geometric parameters 616 and camera parameters 620 may be used to texture map the photographic images received from GIS server 624 to the three-dimensional model. As mentioned above, geometric parameters 616 may include parameters representing various shapes for a three-dimensional model. Moreover, geometric parameters 616 may include a point in three-dimensional space used to curve a surface.

Photogrammetry module 632 may determine a point in three-dimensional space used to curve a surface according to user constraints received by user constraint module 612 and according to camera parameters 620. Photogrammetry module 632 may determine the point using photogrammetry as described above with respect to FIGS. 1-2.

Non-rigid shape solver module 640 determines flexible or non-rigid shapes. For example, non-rigid shape solver module 640 determines a curve for a surface of the three-dimensional model based on the point in three-dimensional space determined by photogrammetry module 632. Non-rigid shape solver module 640 determines the surface to be curved to the point in three-dimensional space. In particular, non-rigid shape solver module 640 may curve the surface outward such that the distance between surface and the point is specified according to Hooke's law. The surface may be represented by a three-dimensional mesh of two-dimensional polygons. In that embodiment, non-rigid shape solver module 640 may determine the three-dimensional mesh such that a distance between respective polygons in the mesh of two-dimensional polygons also satisfies Hooke's law.

Once the three-dimensional model is determined using the photographic images, texture map module 638 may texture map the three-dimensional model using the same images used to create the model. Texture map module 638 may texture map the image to a surface of a three-dimensional model, including a curved surface determined by non-rigid shape solver 640. Texture map module 638 may use back casting to texture map the polygon face. Though in some embodiments, texture map module 638 may leave the face untextured and render the face in a solid color (e.g., black). Further, texture map module 638 may provide an option to a user to add an additional constraint mapping a position on a back-up photographic image to a position on the three-dimensional model. By texture mapping the same images to the three-dimensional model that were used to construct the three-dimensional model, texture map module 638 may enable more efficient modeling and more precise texture mapping.

Each of client 602 and GIS server 624 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a general purpose processor, graphics processor, memory and graphical user interface display. The computing device may also have multiple processors and multiple shared or separate memory components. For example, the computing device may be a clustered computing environment or server farm.

Each of browser 604, user constraint module 612, GIS plug-in module 630, photogrammetry module 632, non-rigid shape solver 640, and texture map module 638 may be implemented in hardware, software, firmware, or any combination thereof.

Each of geometric parameters 616 and camera parameters 620 may be stored in any type of structured memory, including a persistent memory. In examples, each database may be implemented as a relational database.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
   (a) receiving, by one or more computing devices, a first user input specifying a first position on a first photographic image in a plurality of two-dimensional photographic images, the first photographic image taken from a first perspective specified by a first set of camera parameters;
   (b) receiving, by the one or more computing devices, a second user input specifying a second position on a second photographic image in the plurality of two-dimensional photographic images, the second photographic image having a second perspective different from the first perspective and specified by a second set of camera parameters,
      wherein the second user input indicates that a feature located at the second position on the second photographic image corresponds to a feature located at the first position on the first photographic image;
   (c) determining, by the one or more computing devices, using photogrammetry, a point in three-dimensional space according to the first position, the second position, the first set of camera parameters, and the second set of camera parameters; and
   (d) constructing, by the one or more computing devices, a surface of a three-dimensional model based on the point such that the surface is curved to the point in three-dimensional space determined in (c), whereby the determining, using photogrammetry, enables the curved surface to be constructed based on the first and second user inputs and first and second camera parameters.

2. The method of claim 1, further comprising texture mapping each of the first and second photographic images, to a respective surface of the three-dimensional model,
   whereby texture mapping the same images to the three-dimensional model that were used to construct the three-dimensional model increases accuracy of the texture mapping.

3. The method of claim 1, wherein the constructing (d) comprises curving the surface outward to a second point in the three-dimensional space, the distance between the second point and the point constructed in (d) being specified according to Hooke's law.

4. The method of claim 1, wherein the constructing (d) comprises constructing a three-dimensional mesh of two-dimensional polygons, the three-dimensional mesh representing the surface.

5. The method of claim 4, wherein the constructing (d) further comprises constructing the three-dimensional mesh such that a distance between respective polygons in the mesh of two-dimensional polygons satisfies Hooke's law.

6. The method of claim 1, wherein the first photographic image is an oblique aerial photograph of the Earth.

7. The method of claim 1, wherein the first photographic image is a panoramic photograph taken from street-level.

8. The method of claim 1, wherein the first photographic image is a photograph inputted by the user.

9. The method of claim 1, further comprising:
   (e) receiving a third user input specifying a third position on the first photographic image;
   (f) receiving a fourth user input specifying a fourth position on the second photographic image, wherein the fourth user input indicates that a feature located at the fourth position on the second photographic image corresponds to a feature located at the third position on the third photographic image;
   (g) determining, using photogrammetry, a second point in three-dimensional space according to the third position, the fourth position, the first set of camera parameters, and the second set of camera parameters; and
   (h) determining a second surface of the three-dimensional model, the second surface curved toward the second point in three-dimensional space determined in (g).

10. The method of claim 1, further comprising:
    (e) receiving a third user input specifying a third position on the first photographic image;
    (f) receiving a fourth user input specifying a fourth position on the second photographic image, wherein the fourth user input indicates that a feature located at the fourth position on the second photographic image corresponds to a feature located at the third position on the third photographic image;
    (g) determining, using photogrammetry, a second point in three-dimensional space according to the third position, the fourth position, the first set of camera parameters, and the second set of camera parameters; and
    (h) altering surface determined in (d) to include both a first portion curved toward the first point in three-dimensional space determined in (c) and a second portion curved toward the second point in three-dimensional space determined in (g).

11. A system comprising:
    a user constraint module that:
       (i) receives a first user input specifying a first position on a first photographic image in a plurality of two-dimensional photographic images, the first photographic image taken from a first perspective specified by a first set of camera parameters, and
       (ii) receives a second user input specifying a second position on a second photographic image in the plurality of two-dimensional photographic images, the second photographic image having a second perspective different from the first perspective and specified by a second set of camera parameters,
       wherein the second user input indicates that a feature located at the second position on the second photographic image corresponds to a feature located at the first position on the first photographic image;
    a photogrammetry module that determines, using photogrammetry, a point in three-dimensional space according to the first position, the second position, the first set of camera parameters, and the second set of camera parameters; and
    a non-rigid shape solver module that constructs a surface of a three-dimensional model based on the point such that the surface is curved to the point in three-dimensional space determined by the photogrammetry module,
    whereby the photogrammetry module enables the curved surface to be constructed based on the first and second user inputs and first and second camera parameters.

12. The system of claim 11, further comprising:
    a texture map module that texture maps each of the first and second photographic images, to a respective surface of the three-dimensional model, whereby texture mapping the same images to the three-dimensional model used to construct the three-dimensional model increases accuracy of the texture mapping.

13. The system of claim 11, wherein the non-rigid shape solver module curves the surface outward to a second point in the three-dimensional space, the distance between the second point and the point determined by the photogrammetry module being specified according to Hooke's law.

14. The system of claim 11, wherein the non-rigid shape solver module constructs a three-dimensional mesh of two-dimensional polygons, the three-dimensional mesh representing the surface.

15. The system of claim 14, wherein the non-rigid shape solver module constructs the three-dimensional mesh such that a distance between respective polygons in the mesh of two-dimensional polygons satisfies Hooke's law.

16. The system of claim 11, wherein the first photographic image is an oblique aerial photograph of the Earth.

17. The system of claim 11, wherein the first photographic image is a panoramic photograph taken from street-level.

18. The system of claim 11, wherein the user constraint module: (iii) receives a third user input specifying a third position on the first photographic image, and (iv) receives a fourth user input specifying a fourth position on the second photographic image, wherein the fourth user input indicates that a feature located at the fourth position on the second photographic image corresponds to a feature located at the third position on the third photographic image, and wherein the photogrammetry module determines, using photogrammetry, a second point in three-dimensional space according to the third position, the fourth position, the first set of camera parameters and the second set of camera parameters; and wherein the non-rigid shape solver determines a second surface of the three-dimensional model, the second surface curved toward the second point in three-dimensional space determined by the photogrammetry module.

19. A non-transitory computer-readable medium storing instructions that, when executed by one or more computing devices, cause the one or more computing devices to perform operations comprising:

(a) receiving a first user input specifying a first position on a first photographic image in a plurality of two-dimensional photographic images, the first photographic image taken from a first perspective specified by a first set of camera parameters;

(b) receiving a second user input specifying a second position on a second photographic image in the plurality of two-dimensional photographic images, the second photographic image having a second perspective different from the first perspective and specified by a second set of camera parameters, wherein the second user input indicates that a feature located at the second position on the second photographic image corresponds to a feature located at the first position on the first photographic image;

(c) determining using photogrammetry, a point in three-dimensional space according to the first position, the second position, the first set of camera parameters, and the second set of camera parameters; and (d) constructing a surface of a three-dimensional model based on the point such that the surface is curved to the point in three-dimensional space determined in (c), whereby the determining, using photogrammetry, enables the curved surface to be constructed based on the first and second user inputs and first and second camera parameters.

20. The computer-readable medium of claim 19, wherein the constructing (d) comprises curving the surface outward to a second point in the three-dimensional space, the distance between the second point and the point constructed in (d) being specified according to Hooke's law.

21. The computer-readable medium of claim 19, wherein the constructing (d) comprises constructing a three-dimensional mesh of two-dimensional polygons, the three-dimensional mesh representing the surface.

* * * * *